US012559669B2

(12) United States Patent
Ziauddin et al.

(10) Patent No.: US 12,559,669 B2
(45) Date of Patent: **\*Feb. 24, 2026**

(54) ACID STIMULATION METHODS

(71) Applicant: SCHLUMBERGER TECHNOLOGY CORPORATION, Sugar Land, TX (US)

(72) Inventors: Murtaza Ziauddin, Katy, TX (US); Mahmoud Ali, Stafford, TX (US)

(73) Assignee: SCHLUMBERGER TECHNOLOGY CORPORATION, Sugar Land, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/470,882

(22) Filed: Sep. 20, 2023

(65) Prior Publication Data

US 2024/0010906 A1 Jan. 11, 2024

Related U.S. Application Data

(63) Continuation of application No. 17/606,071, filed as application No. PCT/US2020/029449 on Apr. 23, 2020, now Pat. No. 11,767,465.

(Continued)

(51) Int. Cl.
| | |
|---|---|
| *C09K 8/72* | (2006.01) |
| *C09K 8/60* | (2006.01) |

(Continued)

(52) U.S. Cl.
CPC ................ *C09K 8/72* (2013.01); *C09K 8/602* (2013.01); *C09K 8/86* (2013.01); *C09K 2208/30* (2013.01)

(58) Field of Classification Search
CPC ..... G06Q 10/06; E21B 41/00; E21B 41/0092; E21B 43/00; E21B 43/16; E21B 43/26;

(Continued)

(56) References Cited

U.S. PATENT DOCUMENTS

| | | | |
|---|---|---|---|
| 9,098,889 | B2 | 8/2015 | Zhao et al. |
| 9,938,800 | B2 | 4/2018 | Karale et al. |

(Continued)

FOREIGN PATENT DOCUMENTS

| | | |
|---|---|---|
| EP | 2192507 A1 | 6/2010 |
| RU | 2293101 C1 | 2/2007 |

(Continued)

OTHER PUBLICATIONS

Kalia et al. Modeling and analysis of wormhole formation in reactive dissolution of carbonate rocks, Oct. 27, 2006, Chemical Engineering Science, 62, 919-928 (Year: 2006).\*

(Continued)

*Primary Examiner* — Angela M DiTrani Leff
(74) *Attorney, Agent, or Firm* — Jeffrey D. Frantz

(57) ABSTRACT

Stimulation treatments are designed and performed in a manner that takes into account radial acid flow into the formation. A reservoir core plug is selected and a linear core flow test is performed. The core flow test comprises measuring a flowing fraction, injecting into the core plug a treatment volume of at least one candidate stimulation fluid at an injection rate at reservoir conditions, and measuring an effective reaction rate constant. The linear flow data are then scaled to radial flow. A skin, an acid concentration at a wormhole tip and a fluid velocity at a wormhole tip are calculated. A stimulation treatment is then performed. The method can also be performed on analog cores. The stimulation treatment may be matrix acidizing, fracture acidizing or acidizing natural fractures.

14 Claims, 6 Drawing Sheets

Related U.S. Application Data

(60) Provisional application No. 62/838,348, filed on Apr. 25, 2019.

(51) Int. Cl.
C09K 8/86 (2006.01)
E21B 43/27 (2006.01)

(58) Field of Classification Search
CPC ........... E21B 43/27; E21B 43/25; C09K 8/60; C09K 8/602; C09K 8/604; C09K 8/62; C09K 8/72; C09K 8/74; C09K 8/86; C09K 2208/30; C09K 8/76; C09K 8/78; C09K 8/84
See application file for complete search history.

(56) References Cited

U.S. PATENT DOCUMENTS

| | | | |
|---|---|---|---|
| 10,061,061 B2 | 8/2018 | Ziauddin et al. | |
| 10,480,314 B2 | 11/2019 | Ziauddin et al. | |
| 11,767,465 B2 * | 9/2023 | Ziauddin | C09K 8/602 |
| | | | 166/307 |
| 2006/0184346 A1 | 8/2006 | Panga et al. | |
| 2008/0015832 A1 | 1/2008 | Tardy | |
| 2009/0294122 A1 | 12/2009 | Hansen et al. | |
| 2012/0043078 A1 | 2/2012 | Ziauddin et al. | |
| 2014/0212006 A1 * | 7/2014 | Zhao | G06T 7/0004 |
| | | | 382/109 |
| 2015/0285045 A1 * | 10/2015 | Ziauddin | E21B 41/00 |
| | | | 166/305.1 |
| 2016/0076369 A1 * | 3/2016 | Ziauddin | E21B 43/25 |
| | | | 703/2 |
| 2016/0245049 A1 * | 8/2016 | Mogensen | G05B 17/02 |
| 2017/0107796 A1 | 4/2017 | Karale et al. | |
| 2018/0080316 A1 * | 3/2018 | Karale | E21B 43/26 |

FOREIGN PATENT DOCUMENTS

| | | | | |
|---|---|---|---|---|
| RU | 2312210 C1 | 12/2007 | | |
| WO | 2016195623 A1 | 12/2016 | | |
| WO | WO-2018226772 A1 * | 12/2018 | | C09K 8/72 |

OTHER PUBLICATIONS

Search Report and Written Opinion of International Patent Application No. PCT/US2020/029449 on Aug. 12, 2020; 10 pages.

Zakaria et al., "Predicting the Performance of the Acid Stimulation Treatments in Carbonate Reservoirs Using Non-Destructive Tracer Tests", SPE Journal, SPE-174084-PA, Dec. 2015, vol. 20, Issue 6, pp. 1238-1253.

Zakaria et al., "Flow of Emulsified Acid in Carbonate Rocks", Industrial & Engineering Chemistry Research, 2015, vol. 54, No. 16, pp. 4190-4202.

Office Action issued in Kazakhstan Patent Application No. 2021/9710.1 dated Dec. 7, 2022, 12 pages with English Abstract.

Buijse et al., "A semiempirical Model to Calculate Wormhole Growth in Caronate Acidizing", Oct. 9-12, 2005, SPE 96892 (Year: 2005).

International Preliminary Report on Patentability of International Patent Application No. PCT/US2020/029449 dated Nov. 4, 2021, 7 pages.

* cited by examiner

| | |
|---|---|
| ——— | (-2.6 Skin, 3 ft. Wormhole) |
| - - - - - | (-3.7 Skin, 10 ft. Wormhole) |
| —·—·—·— | (-4.4 Skin, 20 ft. Wormhole) |

Radial Plot

ACID STIMULATION METHODS

CROSS-REFERENCE TO RELATED APPLICATION

This application is a continuation of U.S. patent application Ser. No. 17/606,071, now U.S. Pat. No. 11,767,465, filed Oct. 25, 2021, entitled "Acid Stimulation Methods," which is a National Stage Entry of International Patent Application No. PCT/US2020/029449, filed on Apr. 23, 2020, which claims priority to and benefit of U.S. Patent Provisional Application No. 62/838,348, filed Apr. 25, 2019, entitled "Acid Stimulation Methods", which are both incorporated herein by reference in their entirety.

BACKGROUND

The statements in this section merely provide background information related to the present disclosure and may not constitute prior art.

Exploring, drilling and completing hydrocarbon and other wells are generally complicated, time consuming and ultimately very expensive endeavors. As a result, oilfield efforts are often largely focused on techniques for maximizing recovery from each and every well. Whether the focus is on drilling, unique architecture, or step-by-step interventions directed at well fracturing, the techniques have become quite developed over the years. One such operation at the well site directed at enhancing hydrocarbon recovery from the well is referred to as a stimulation application.

Wellbore stimulation is a widely practiced treatment method to enhance the production of hydrocarbons from oil or gas wells traversing subterranean reservoirs by removing near-wellbore formation damage or by creating alternate flow paths through the formation. One type of stimulation is an acid stimulation in which a particular acid is directed into the well at a particular volume and rate depending on a host of factors such as formation type, temperature, etc. Acid stimulation may comprise injecting a stimulation fluid into an isolated treatment zone at pressures below the fracture pressure of the formation. In some instances, the injected fluid may extend the effective wellbore drainage radius by dissolving formation rock to form channels such as wormholes or remove formation damage induced during drilling operations. The purpose of such stimulation techniques is often to increase the production rate by increasing the near borehole equivalent permeability.

Designing an acid stimulation application may be a challenge. Which acid type works best, the rate of introduction and a host of other factors may be considered. Historical data documenting past efforts may be available. However, operators would often prefer a well-specific set of criteria and information. For example, the possibility exists of designing and running an acid stimulation and performing a pressure build-up on the well to ascertain effectiveness of wormhole formation. However, such testing is expensive. Further, the information is obtained after performing the designed application.

A more cost-effective approach to obtaining a visual model of stimulation design is to plot pore volume of acid to breakthrough against injection rates, with "breakthrough" being indicative of the desired wormhole forming. That is, with known porosity, formation type and other characteristics, a model may be constructed in which curves of different acid types illustrate how much acid is supplied before "breakthrough" is attained, depending on the injection rate of the acid. This breakthrough is the point at which pressure resistance to the stimulation fluid becomes substantially negligible due to the formation of channel-like wormhole(s) that allow for a more free flow of fluid. Unfortunately, while cost-effective, the resultant modeling may be lacking in accuracy. Specifically, the optimal injection rate may vary significantly from the model because the model may employ a linear function. In reality, the acid behavior upon injection during stimulation is a radial dispersion that is largely unaccounted for by the known modeling techniques. As a result, operators may receive a potentially inaccurate assessment concerning the optimal injection rate when designing the stimulation application.

SUMMARY

The present disclosure provides techniques for providing acid stimulation models that present a radial breakthrough curve. That is, rather than relying on a linear pore volume to breakthrough (PVBT) curve plotted against velocity, a radial PVBT curve that accounts for radial flow due to targeted wormhole lengths may be generated and utilized by operators when designing specific acid stimulation applications.

In an aspect, embodiments relate to methods for stimulating a carbonate formation. A reservoir core plug is selected and a linear core flow test is performed. The core flow test comprises measuring a flowing fraction, and injecting into the core plug a treatment volume of at least one stimulation fluid at an injection rate. The injecting takes place at reservoir conditions. An effective reaction rate constant is also measured. The linear core data is then scaled to radial flow. A skin, an acid concentration at a wormhole tip and a fluid velocity at the wormhole tip are calculated according to the treatment fluid volume and injection rate. A stimulation treatment is then performed.

In a further aspect, embodiments relate to methods for stimulating a carbonate formation. An analog core is selected and a virtual linear core flow test is performed. The virtual core flow test comprises calculating a flowing fraction, and simulating the injection into the core plug a treatment volume of at least one stimulation fluid at an injection rate. The injecting takes place at reservoir conditions. An effective reaction rate constant is also calculated. The linear core data is then scaled to radial flow. A skin, an acid concentration at a wormhole tip and a fluid velocity at the wormhole tip are calculated according to the treatment fluid volume and injection rate. A stimulation treatment is then performed.

DETAILED DESCRIPTION

Figure 1:
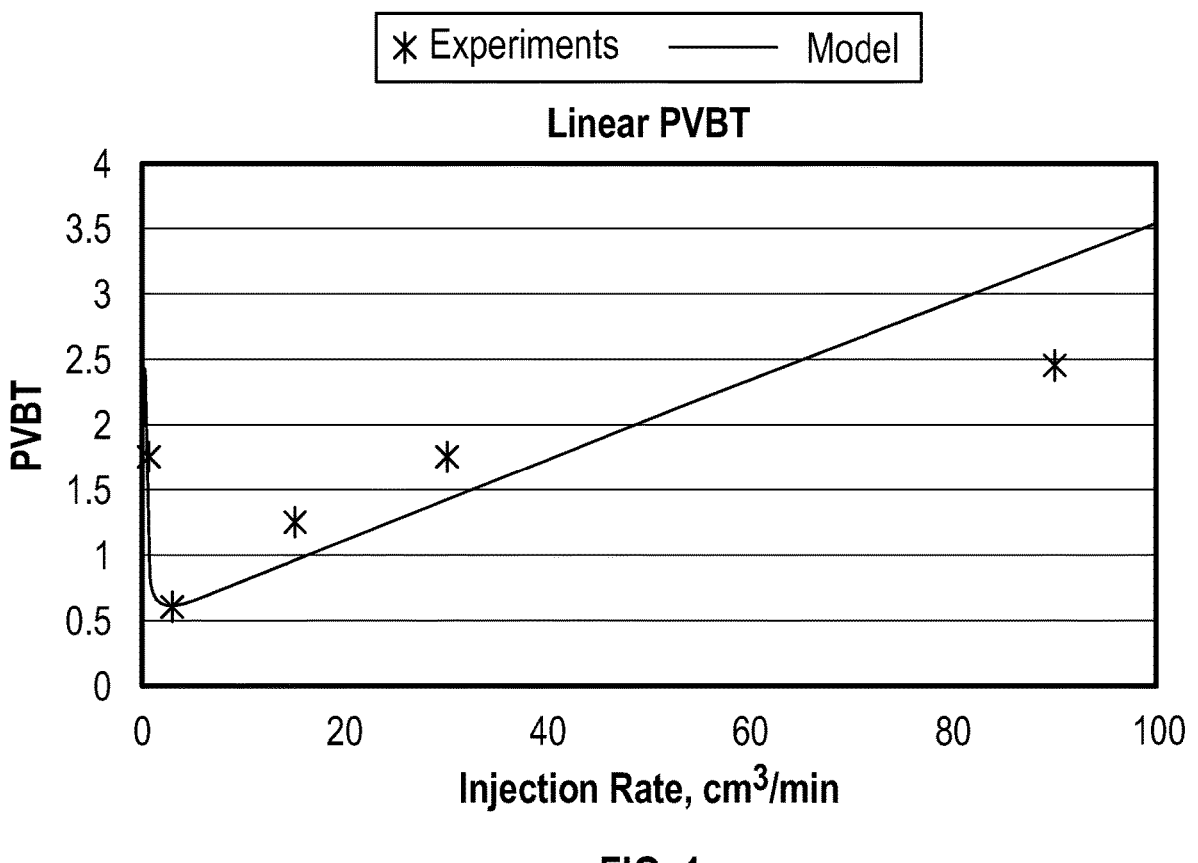
FIG. 1 presents a PVBT comparison between experimental core flow data and a computational model.

In the following description, numerous details are set forth to provide an understanding of the present disclosure.

However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

As used herein, the terms "treatment fluid," "acidizing fluid" or "wellbore treatment fluid" are inclusive of "stimulating treatment" and should be understood broadly. These may be or include a liquid, a foam, a solid, a gas, and combinations thereof, as will be appreciated by those skilled in the art. A treatment fluid may take the form of a solution, an emulsion, slurry, or any other form as will be appreciated by those skilled in the art. It should be understood that, although a substantial portion of the following detailed description may be provided in the context of acidizing operations, other oilfield operations such as cementing, gravel packing, etc., or even non-oilfield well treatment operations, can utilize and benefit as well from the disclosure of the present methods of formation treatment.

As used herein, the term "pore volume to breakthrough" or "PVBT" is defined as the ratio of the volume of fluid injected to achieve channel breakthrough of the volume of the pore space in a core.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

One of the goals of wellbore stimulation is to remove or bypass formation damage that may be present in the near-wellbore region of the formation by creating high-conductivity flow channels. During stimulation treatments in hydrocarbon reservoirs, injection conditions of treatment fluids may control the resulting dissolution patterns produced in the formation that may vary in structure from uniform, conical, and wormhole types as new channels are created. The shape and structure of these channels may depend on a number of factors, including the type of stimulating fluid, the injection rate, the concentration of the active species in the stimulation fluid, the chemical kinetics of the reaction between stimulation fluid and the formation, and the thickness and permeability of the damaged zone.

In an aspect, embodiments relate to methods for stimulating a carbonate formation. A reservoir core plug is selected and a linear core flow test is performed. The core flow test comprises measuring a flowing fraction, and injecting into the core plug a treatment volume of at least one stimulation fluid at an injection rate. The injecting takes place at reservoir conditions. An effective reaction rate constant is also measured. The linear core data is then scaled to radial flow. A skin, an acid concentration at a wormhole tip and a fluid velocity at the wormhole tip are calculated according to the treatment fluid volume and injection rate. A stimulation treatment is then performed.

In a further aspect, embodiments relate to methods for stimulating a carbonate formation. An analog core is selected and a virtual linear core flow test is performed. The virtual core flow test comprises calculating a flowing fraction, and simulating the injection into the core plug a treatment volume of at least one stimulation fluid at an injection rate. The injecting takes place at reservoir conditions. An effective reaction rate constant is also calculated. The linear core data is then scaled to radial flow. A skin, an acid concentration at a wormhole tip and a fluid velocity at the wormhole tip are calculated according to the treatment fluid volume and injection rate. A stimulation treatment is then performed.

For both aspects, the subterranean formation may comprise carbonate minerals. The carbonate minerals may comprise calcite, limestone and dolomite.

For both aspects, the flowing fraction may be determined by destructive core flow testing or by a non-destructive technique utilizing non-reactive tracers.

For core samples having heterogeneous pore sizes and connectivity, flow capacity (the total volumetric flow for a given flow path) may be higher relative to the storage capacity (the total volumetric flow for the total sample volume), which can indicate a reduced flowing fraction (f)

due to the lack of pore connectivity through a given sample. The reduced flowing fraction may affect stimulating treatments in a number of ways. For example, in samples with poor connectivity, the reduced access of stimulating treatments to these regions of the formation may mean that stimulating treatments pass more quickly through a given formation when compared formations having well connected and homogenous porosity, with the end result that stimulation of the formation is incomplete and targeted hydrocarbon bearing regions are bypassed or inadequately stimulated.

The flowing fraction determined in accordance with the instant methods is the fraction of the sample containing interconnected pore space that participates in fluid transport of flowing media, as opposed to the unconnected pore space or "dead-end" pore space. In particular embodiments, the flowing fraction may be defined as the cumulative pore volume injected corresponding to the normalized tracer fluid concentration at $C/C_o=0.5$. As will be shown, the flowing fraction may be correlated with the PVBT for a porous sample and used to estimate a number of useful factors for preparing stimulation treatments, including selection of the type and concentration of stimulating fluid, and estimating the appropriate injection pressure and volume for treatment.

Once the flowing fraction and/or the porosity of the formation has been determined, the estimated PVBT curves of different carbonate rock types may be collapsed into a single curve by normalizing the PVBT for each sample by the respective flowing fractions measured. More specifically, the PVBT for different rocks may be recalculated based on the flowing porosity so that the PVBT curves of the carbonate rock types of different magnitude of pore-scale heterogeneity combine into one single curve, allowing an operator to optimize, for example, the concentration and injection pressure for a stimulating treatment. The inventors thus believe that determination of PVBT may be used for the design of the matrix stimulation treatments in carbonates.

Methods in accordance with the present disclosure may be useful in building a numerical model of reactive flows in a formation. Further, once a numerical model is developed, analysis using destructive techniques is no longer obligatory, as the same information may be obtained by determining the flowing fraction of the non-reactive tracer fluid alone. In other embodiments, an operator may validate the flow model on location by sampling cores of the target region by injecting a tracer to calculate the flowing fraction, then compare the obtained results with a previously generated numerical model. If differences are observed, the numerical model may be updated; on the other hand, if no differences are observed the operator may proceed with designing the stimulation treatment.

In particular embodiments, quantifying the pore-scale heterogeneity of a formation may be used to correlate the porosity-permeability relationship to the pore-scale heterogeneity of a formation and determine the flowing fraction. Specifically, the magnitude of pore-scale heterogeneity is inversely proportional to flowing fraction (f), in that, as the flowing fraction increases (such as the case when a sample exhibits homogenous pore structure), the magnitude of the pore-scale heterogeneity decreases.

Pore-scale heterogeneity may also be described by a number of relevant structural features such as the types of porosity, pore size, pore throat connectivity, and fabric and texture present in a given sample. In one or more embodiments, pore-scale heterogeneity may be quantified using a number of optical or fluorescent microscopy techniques. For example, in particular embodiments, a thin section of a core or other porous medium may be injected with a dye-containing epoxy and then examined via optical or fluorescent spectroscopy to determine, for example, the ratio of the sample that is occupied versus visible pore volume containing dye or other marker. Such techniques may provide insight into relevant factors such as pore size and pore throat and may be used alone or in combination with other techniques described herein to adjust an existing PVBT curve from a predetermined porous medium to account for differences in pore structure.

Methods for determining pore-scale heterogeneity may include, for example, optical microscopy techniques, x-ray computer tomography, mercury injection capillary pressure (MICP), and wireline techniques such as NMR relaxometry to generate a well length log of T2 measurements. While a number of methods are discussed, it is also envisioned that other techniques for quantifying the porosity of a porous medium known or developed in the art may be compatible with wellbore treatment methods of the instant disclosure.

In other embodiments, MICP may be used to quantify the pore-scale heterogeneity. Mercury porosimetry is based on the capillary law governing liquid penetration into small pores. Capillary forces in the porous medium are a function of surface and interfacial liquid tensions, pore-throat size and shape, and the wetting properties of the rock. The incremental mercury intrusion volume at a given pressure corresponds to the pore throat permeable to mercury at as given pressure, which provides a measure of overall pore size and connectivity.

In still other embodiments, a numerical flow model for porous medium or formation may be obtained by scanning a porous sample with computed tomography (CT) to create a 3D rendering of external and internal geometry, including pore space. In addition to pore structure and geometry, CT has also been used to calculate other relevant physical properties including absolute permeability, relative permeabilities, and capillary pressure for a given sample.

In addition, the porosity characterizations listed above may also be used to analyze the pore structure prior to stimulation treatment and, in some embodiments, may be followed by performing a stimulation treatment such as acidization and subsequently performing a CT scan of the stimulated cores to visualize the wormhole dissolution pattern.

In one or more embodiments, operators may use petrophysical logs or measurements to reduce or replace sampling of rock properties by coring. Petrophysical measurements compatible with the described methods may be used to estimate the flowing fraction and thus deducing an adjusted PVBT for a given rock type. Useful logs or measurements that describe elements of pore-scale heterogeneity may include wireline measures such as T2 response from NMR, a micro CT scans or logs, an SEM imaging, microresistivity logs generated using a formation micro-imager (FMI) tool, and combinations thereof.

NMR tools useful in accordance with the instant disclosure may generate continuous well logs once emplaced within a given formation. Measurements obtained from an NMR tool (such as $T_1$, $T_2$, $T_1/T_2$, and D) are proportional to the density of nuclear spins (i.e., protons) present in a given interval of the wellbore or sample. In addition, the NMR transverse relaxation time distribution (T2 distribution) is largely related to pore-size distribution in the rock sample, and to a lesser degree factors such as surface relaxivity and fluid type. The NMR logs obtained are therefore a measure of the porosity downhole, and may be converted to a NMR porosity log, by comparing the measured response for each fluid with the calibrated 100% porosity.

Once these logs are obtained and interpreted, the operator may then optimize and/or design a wellbore stimulation operation based on the results obtained. While calculating the PVBT by measuring the flowing fraction using non-reactive tracers may not always be possible, if such data are not available, an estimate of the PVBT may be obtained from several other rock properties that correlate with the fractional flow. For example, the distribution of pore throat radii may be used to estimate PVBT. While not bound by any particular theory, it is believed that, as the distribution of pore throat radii skews towards larger pores, the smaller the observed PVBT. This is believed to be due to the preferential flow of fluids thru the network of larger pores. Several methods for estimating the pore throat radii in accordance with methods described herein are available, such as mercury porosimetry (high pressure mercury injection), NMR T2 distributions, thin sections, micro CT images, or porosity and permeability relations.

In one or more embodiments, the flowing fraction of a porous sample may be estimated by injecting a non-reactive tracer fluid through the sample, determining a normalized tracer concentration from the sample effluent, estimating the residence time distribution of the tracer fluid to quantify the storage geometry of the flow paths, and determining the flowing fraction from capacitance models or experimental data. As used in accordance with this application, a non-reactive tracer fluid is a fluid containing a measurable species that may be used to simulate the flow of a stimulating fluid or other wellbore treatment fluid through a porous medium without damaging the sample or altering its chemical properties.

In one or more embodiments, the flowing fraction may be determined through a number of possible testing arrangements. For example, measurements may be conducted in laboratory-scale measurements by injecting a non-reactive tracer fluid through a sample of porous medium or core sample; or measurements may be obtained in the field by injecting a tracer fluid through the formation between an injection well and production well(s), or injecting the tracer fluid into a well and allowing the tracer to flow back into the injection well. Indeed, once the correlation between flowing fraction and PVBT is known, an operator may be capable of estimating a PVBT for a formation by flowing a suitable tracer through the area of interest, then by collecting it on a second "connected" well such as a production well, or by allowing it to flow back into the primary injection well. Thus, based on the flowing fraction measured, the operator will be able to design an optimized acidizing job to maximize fluid recovery from the estimated or "adjusted" PVBT.

Non-reactive tracer fluids in accordance with the present disclosure may be an aqueous fluid containing a detectable species such as an ion, isotope, or dye molecule by which an operator may identify when the tracer fluid has passed through sample and measured through a number of analytical techniques including, for example, inductively coupled plasma atomic emission spectroscopy (ICP-AES), gas chromatography, high pressure liquid chromatography, electrochemical detection, Fourier transform infra-red spectroscopy, UV-Vis spectroscopy, and fluorescence spectroscopy.

Examples of tracers compatible with the instantly described methods include ion-containing fluids such as brine containing for example potassium, sodium, lithium, magnesium, calcium, bromides, iodides, etc.; fluids containing more complex salts such as nitrate, thiocyanate, fluorobenzoic acids, or hydrogen borates; enriched isotopic fluids such as deuterated or tritiated water; or tracer fluids containing colorimetric or fluorescent dyes such as rhodamine, cyanine dyes, or fluorescein.

In other embodiments, the tracer may be a gas injected through a sample such as $N_2$, or $CO_2$, sulfur hexafluoride, freons, deuterated hydrocarbons, noble gases such as He and Ar, perfluorocarbons such as perfluorodimethylcyclobutane (PDMCB), perfluoromethylcyclopentane (PMCP), perfluoromethylcyclohexane (PMCH), 1,2- and 1,3-perfluorodimethylcyclohexane (1,2-/1,3-PDMCH). Tracer fluids in accordance with the instant disclosure may also include alcohols such as methanol, ethanol, and propanol; and hydrocarbon tracers such as propane, propene, butene, butane, and pentane.

In yet another embodiment, the tracer may a naturally occurring component of the target rock or reservoir fluids, including any of the aforementioned ions or detectable species, which is carried out of the sample or formation during the injection of non-reactive tracer fluid. Non-reactive tracer fluids may also include fluids that generate a tracer in situ by the reaction of an injected fluid with rock component or reservoir fluid downhole.

Further, depending on the desired stimulation fluid to be used in subsequent stimulation operations, the non-reactive tracer fluid may be modified with emulsifiers or viscosifiers to match the corresponding rheology of the active stimulating fluid. For example, non-reactive tracer fluids may be emulsified with an appropriate surfactant or mixed with rheology modifiers known in the art such as xanthan gums or polysaccharides. In one or more embodiments, the non-reactive tracer fluid may be an aqueous fluid, an emulsion, an invert emulsion, or a foam.

Linear Model

For this disclosure it is assumed that the acid flows down the wormhole channel with constant velocity and reacts with the wormhole walls as it travels from the inlet to the tip. The acid that reaches the tip is consumed in the wormhole longitudinal growth and in stimulating the matrix around the wormhole channel. It is assumed that the entire rock porosity is accessible to the acid. The mass of rock ($dm_R$) is dissolved for the wormhole to grow by a length dl can be expressed as $$dm_R = (a_w(1-\varphi_t)\rho_R + a_m(1-\varphi_t)\rho_R x)dl \qquad (1)$$

where $a_w$ is the cross-sectional area of a wormhole, $a_m$ is the cross-sectional area of the enhanced matrix around a wormhole, $\varphi_t$ is the total porosity of the rock, $\rho_R$ is the rock density, and x is the fraction of rock dissolved in the enhanced matrix around the wormhole.

Computed tomography (CT) images of the acidized cores show that for most injection rates the diameter of the wormhole is almost constant along the core and x<<1. Eq. 1 can be simplified to $$dm_R = (a_w(1-\varphi t)\rho_R)dl. \qquad (2)$$

For x<<1, the mass of acid ($m_A$) consumed in dt, is given by $$m_A = C_A\rho_A v a_w dt, \qquad (3)$$

where $C_A$ is the acid concentration at the tip, $\rho_A$ is the fluid density, v is the velocity of the acid at the tip.

The dissolving power of acid ($\beta$) is defined as follows.

$$\beta = \frac{(1-\varphi_t)\rho_R dl}{c_A\rho_A v dt} \qquad (4)$$

Rearranging the equation, $$\frac{dl}{dt} = \frac{vC_A X}{(1 - \varphi_t)},$$  (5)

where $$X = \frac{\beta \rho_A}{\rho_R},$$  (10)

is defined as the acid volumetric dissolving power.

For a first order irreversible reaction the mass balance on the acid yields $$\frac{dC_A}{dl} = -\frac{k_{eff} c_A}{v}$$  (6)

$k_{eff}$ is the effective reaction rate constant.

Two mechanisms affect the fluid velocity in the wormhole channel. The generation of carbon-dioxide by the reaction increases the fluid volume and hence speeds up the fluid, while the fluid leakoff from the walls slows it down. The net change in fluid velocity is assumed to be minor. To simplify the model equations the fluid velocity in the wormhole is assumed to be constant for linear flow. Integrating and solving for $C_A$.

$$C_A = C_{Ao} e^{-\frac{k_{eff} l}{v}}$$  (7)

where $C_{Ao}$ is the acid concentration at the inlet, and l is the length of the wormhole.

Substituting for $C_A$ from in Eq. 6, integrating and solving for time, t for wormhole to propagate a distance 1.

$$t = \frac{(1 - \varphi_t)}{C_{Ao} X k_{eff}} \left( e^{\frac{k_{eff} l}{v}} - 1 \right)$$  (8)

Pore volume of acid to breakthrough (PVBT) is defined as $$\frac{q_o t_b}{A_o l_c \Phi_t},$$

and can be calculated as follows.

$$PVBT = \frac{q_0 (1 - \varphi_t)}{A_0 l_c \varphi_t C_{Ao} X k_{eff}} \left( e^{\frac{k_{eff} l_c}{v}} - 1 \right)$$  (9)

where $t_b$ is the breakthrough time, and $l_c$ is the core length.

The same concept can be applied to relate PVBT's of two rock types (where subscripts 1 and 2 represent parameter values for rock type 1 and 2, respectively).

$$\frac{PVBT_1}{f_1} = \frac{PVBT_2}{f_2}$$  (10)

The model equations are made dimensionless by defining the following variables.

$$Da = \frac{k_{eff} L}{v}, \quad c = \frac{C_A}{C_{Ao}}, \quad \lambda = \frac{l}{L}, \quad \tau = \frac{t}{M}, \quad r = \frac{r_c}{L}, \quad \omega = \frac{v}{v_o},$$

where Da is the Damköhler number, A is the dimensionless length, L is the characteristic length, τ is the dimensionless time, M is the characteristic time, r is the dimensionless radius, $r_c$ is the core radius, ω is the dimensionless velocity and $v_o$ is the Darcy velocity.

The dimensionless form of the PVBT equation is $$PVBT = \frac{(1 - \varphi_t)}{\varphi_t \lambda C_{Ao} X \omega Da} \left( e^{Da\lambda} - 1 \right).$$  (11)

Estimation of Effective Reaction Rate

The dissolution of the carbonate rock by acid is controlled by the rate of $H^+$ transfer from the bulk to the wormhole wall as well as the surface reaction rate at the wall. Assuming local equilibrium between these two processes and assuming a first-order surface reaction:

$$k_s C_s = k_m (C_A - C_s)$$  (12)

Where, $k_s$ is the surface reaction rate constant, $C_s$ is the acid concentration at the rock surface, and $k_m$ is the mass transfer coefficient.

Solving for $C_s$, $$C_s = \frac{k_m C_A}{k_m + k_s}.$$  (13)

Substituting back into Eq. 13, $$k_s C_s = \frac{k_m k_s}{k_m + k_s} C_A = k_{eff} C_A$$  (14)

where $$k_{eff} = \frac{\kappa_m \kappa_s}{k_m + k_s}.$$

The effective reaction rate constant ($k_{eff}$) is an overall reaction rate constant and accounts for both surface reaction and mass transfer rates. As a first approximation the mass transfer can be assumed to be proportional to the diffusion coefficient.

Surface Reaction Rate

The reaction rate constant ($k_s$) in 1/s can be expressed as $$k_s = a_v k_{so} e^{\left( \frac{Ea}{RT} \right)},$$  (15)

where $k_{so}$ is the pre-exponential factor for the reaction, R is the universal gas constant, and $E_a$ is the activation energy. For limestone-HCl system, the surface reaction rate is orders of magnitude higher than the mass transfer rate (i.e. the mass transfer is the rate controlling step) for almost all practical acidizing scenarios. Consequently, $k_{eff} \approx k_m$ to an excellent approximation and the precise value of $k_s$ is not needed. For dolomites, the surface reaction is rate-limiting at low temperatures and $k_s$ must be included in calculating the effective reaction rate.

Fluid Velocity Inside a Wormhole

An expression for the velocity inside the wormhole may be $$q_0 = q_m = q_{wh} \tag{16}$$

where $q_0$ is the total flow in the core, $q_{wh}$ is the total flow in all the wormholes and $q_m$ is the total flow in the matrix (including stimulated matrix around the wormhole as well as the unstimulated matrix). $q_{wh}$ can be expressed in terms of average fluid velocity inside the wormhole (v).

$$q_{wh} = v n_{wh} \pi r_{wh}^2 \tag{17}$$

where $n_{wh}$ is the number of the wormholes and $r_{wh}$ is the average radius of the wormhole. $q_{wh}$ can be expressed in terms of pressure drop ($\Delta P$) using Hagen-Poiseuille equation:

$$q_{wh} = \frac{n_{wh} \pi r_{wh}^4 \Delta P}{8 \mu l} = v n_{wh} \pi r_{wh}^2 \tag{18}$$

where $\mu$ is the fluid viscosity.

Similarly, $q_m$ can be expressed in terms of pressure drop ($\Delta P$) using Darcy's equation:

$$q_m = \frac{K A_m \Delta P}{\mu l} \tag{19}$$

where K is the effective matrix permeability in $m^2$ and $A_m$ is the effective matrix cross-sectional flow area.

Dividing Eq. 18 by Eq. 19 and assuming the transverse pressure gradient is negligible, $$\frac{q_{wh}}{q_m} = \frac{n_{wh} \pi r_{wh}^4}{8 K A_m}. \tag{20}$$

Substituting back in Eq. 16 and solving for v yields $$v = \frac{q_0}{\left( \frac{8 K A_m}{r_{wh}^2} + n_{wh} \pi r_{wh}^2 \right)}. \tag{21}$$

Assuming $r_{wh} \approx r_{wh.opt}$ and $$n_{wh} \approx \frac{q_0}{q_{opt}},$$

$$v = \frac{q_0}{\left( \frac{8 K A_m}{r_{wh.opt}^2} + \frac{q_0}{q_{opt}} \pi r_{wh.opt}^2 \right)}. \tag{22}$$

Dividing by $A_o$ and simplifying, yields $$v = \frac{v_o}{\left( \frac{8 K A_m}{r_{wh.opt}^2 A_0} + \frac{q_0}{q_{opt}} \pi r_{wh.opt}^2 \right)}. \tag{23}$$

$A_m$ is the area of the enhanced permeability zone around the wormholes. It is intuitive that the ratio of the enhanced permeability area and the cross-sectional area of the core decreases for larger cores, and it is always $>1$. This enhanced permeability area is influenced by both the acid recipe and the rock type. In this disclosure, $A_m$ is approximated as equal to $\gamma A^n$, where A is the cross-sectional area available for flow for a given wormhole penetration. The fractal dimension, n, captures the influence of the rock and acid type, while $\gamma$ is introduced to convert the units back to length squared. For linear coreflood experiments, A is assumed to be constant and approximately equal to $A_o$. This is because the total cross-sectional area of wormholes is small compared to the core diameter for most injection rates. Therefore, Eq. 24 may be written in terms of A as follows.

$$v = \frac{v_o}{a \frac{A^n}{A_o} + b v_o}, \tag{24}$$

where a and b are defined as $$a = \frac{8 K \gamma}{r_{wh.opt}^2} \tag{25}$$

$$b = \frac{\pi r_{wh.opt}^2}{q_{opt}} \tag{26}$$

which, in dimensionless form, is:

$$\omega = \frac{1}{\left[ \frac{a}{A_o} \left( \pi L^2 r^2 \right)^n + b v_o \right]} \tag{27}$$

Radial Model

For the present disclosure, the linear model was extended to the radial flow by calculating the cross-sectional area for acid flow as the wormhole propagates deeper in the reservoir. For a wormhole of length l. the cross-sectional flow area A is equal to 2 $(r_w + l) h_0$. Substituting in Eq. 21, $$v \approx \frac{v_o}{a \frac{(2\pi (r_w + l) h_o)^n}{A_o} + b v_o}. \tag{28}$$

Note that fluid velocity inside the wormhole decreases as cross-sectional area available for flow increases. Eq. 28 can be written in the dimensionless form as follows.

$$\omega = \frac{1}{\left[ \frac{a}{A_o} \left( 2h\pi L^2 [\beta + \lambda] \right)^n + b v_o \right]}, \tag{29}$$

where $r_w$ is the wellbore radius, $h_o$ is the pay-zone thickness, h is the dimensionless thickness, defined as $h_o/L$, and β is the dimensionless wellbore radius, defined as $r_w/L$.

The mass balance equation for the acid can be written in the dimensionless form for radial flow as $$\frac{dc}{c} = -\frac{Lk_{eff}}{v_o}\frac{1}{\omega}d\lambda \tag{30}$$

Integrating and solving for the acid concentration, $$\ln c = -\frac{Lk_{eff}}{v_o}\left[\frac{a(2h\pi L^2)^n}{A_o(n+1)}(\beta+\lambda)^{n+1} + bv_o\lambda - \frac{a(2h\pi L^2)^n}{A_o(n+1)}\beta^{n+1}\right]. \tag{31}$$

Recall that $$Da = \frac{k_{eff}L}{v} \text{ and } \omega = \frac{v}{v_o}.$$

Rearranging and simplifying, $$c = e^{-Da\omega\alpha} \tag{32}$$

where $$\alpha = \left[\frac{a(2h\pi L^2)^n}{A_o(n+1)}\left((\beta+\lambda)^{n+1} - \beta^{n+1}\right) + bv_o\lambda\right].$$

The equation of wormhole growth can be written in the dimensionless form as:

$$\frac{d\lambda}{d\tau} = \frac{M}{L}v_o C_{Ao} X\omega e^{-Da\omega\alpha} \tag{33}$$

Integrating and rearranging, $$\tau = \frac{L}{Mv_o C_{Ao}X}\int_0^\lambda \frac{e^{Da\omega\alpha}}{\omega}d\lambda. \tag{34}$$

It follows that the volume of acid required to reach a specified wormhole penetration is given by:

$$V_A = \frac{LA_o}{C_{Ao}X}\int_0^\lambda \frac{e^{Da\omega\alpha}}{\omega}d\lambda. \tag{35}$$

The parameters in the model were estimated by fitting the model to coreflood data reported in the literature. It should be noted that the same parameter values are employed for both the linear and radial versions of the model. The data covers HCl concentrations between 0.5 wt. % to 20 wt. %, temperature from 72° F. to 320° F., core lengths from 4 in. to 20 in. and core diameters of 1 in. to 7 in. Both plain acid and emulsified acid were included. Data on plain acid included data with and without corrosion inhibitor (CI). Multiple rock types were included as well. Data on limestone acidizing is far more abundant in the literature than on dolomite acidizing. Therefore, the confidence in limestone parameters may be higher than those for dolomite. The parameters in Table 1 are used in all of the modeling results presented in this disclosure.

TABLE 1

| Values of the adjusted parameters for the studied acid-mineral systems. | | | | |
|---|---|---|---|---|
| Limestone | n | a, $(m)^{2(1-n)}$ | b, (s/m) | $k_o$, $(1/m^2)$ |
| HCl (without CI) | 0.65 | 2.68E−04 | 17.3 | 2.43E+07 |
| HCl (with CI) | | 5.10E−04 | 35.1 | 2.43E+06 |
| Emulsified Acid | | 4.61E−04 | 15.5 | 2.85E+07 |
| Dolomite | | | T < 358.15 | T > 358.15 |
| HCl (without CI) | 0.75 | 3.96E−03 | 1.65E+12exp (−0.09 T) | 16.5 | 1.09E+06 |
| HCl (with CI) | | 8.28E−03 | 1.66E+14exp (−0.081 T) | 50.4 | |
| Emulsified Acid | | 3.31E−03 | 1.2E+14exp (−0.081 T) | 36.4 | 3.00E+06 |

For both aspects, the linear and radial PVBT curves may be determined from core-flow tests or computer simulations. Methods for producing radial PVBT curves are presented in U.S. Patent Application No. 2008/0015832 (Tardy), which is incorporated herein in its entirety.

For both aspects, the optimal acid may comprise hydrochloric acid, emulsified hydrochloric acid, hydrofluoric acid, hydrobromic acid, formic acid, citric acid, chelating agents of combinations thereof. In one or more embodiments, the stimulating fluid may be an acid applied at a concentration that ranges from 5 to 28 percent by weight (wt %). However, one skilled in the art will appreciate this general range may be greater or lower in some embodiments depending on the chemistry of the stimulating fluid used (e.g., greater concentrations may be required for weak acids or chelant-containing stimulating fluids).

Possible chelants suitable for the described methods may include, for example, EDTA (ethylenediamine tetraacetic acid), diethylenetriaminepentaacetic acid (DTPA), citric acid, nitrilotriacetic acid (NTA), ethylene glycol-bis(2-aminoethyl)-N,N,N',N'-tetraacetic acid (EGTA), 1,2-bis(o-aminophenoxy) ethane-N,N,N',N'-tetraacetic acid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and diethanolamine (DEA).

For both aspects, the initial acid pumping schedule may further comprise the use of mechanical or chemical diversion techniques. Mechanical diversion techniques may include ball sealers and packers. Chemical diversion techniques may include the addition of particulate additives, foaming agents, and viscoelastic surfactants (VES) to the acid formulations. The VES may be cationic, anionic, non-ionic or zwitterionic. Example VES systems include OIL-SEEKER™ and VISCOELASTIC DIVERTING AGENT (VDA), both available from Schlumberger.

For both aspects, a series of reservoir core plugs may be tested, during which the treatment fluid volume and injection rate may be varied.

For both aspects, the treatment fluid, treatment fluid volume and injection rate may be chosen to design a treatment with maximum stimulation effect.

EXAMPLES

Example 1

A series of linear core flow tests were performed on Indiana limestone cores with an average permeability of 76 mD. The stimulation fluid was 15% HCl and the test temperature was 150° F. (66° C.). The fluid injection rate was varied from 0.5 cm³/min to 90 cm³/min. The PVBT results are shown in Table 2.

TABLE 2

| PVBT results from linear core flow tests with Indiana limestone cores. | |
| --- | --- |
| q, cm³/min | PVBT |
| 90 | 2.455 |
| 30 | 1.745 |
| 15 | 1.25 |
| 3 | 0.6 |
| 0.5 | 1.75 |

Based on the experimental conditions and acid type, the model parameters were calculated using Eq. 9. FIG. 1 shows a comparison between the model and the experimental data.

Figure 2:
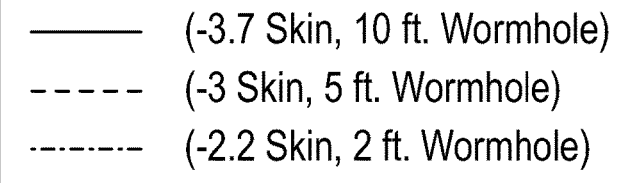
FIG. 2 presents the data from FIG. 1, upscaled to radial flow, for various skin factors and wormhole lengths.
Figure 2:
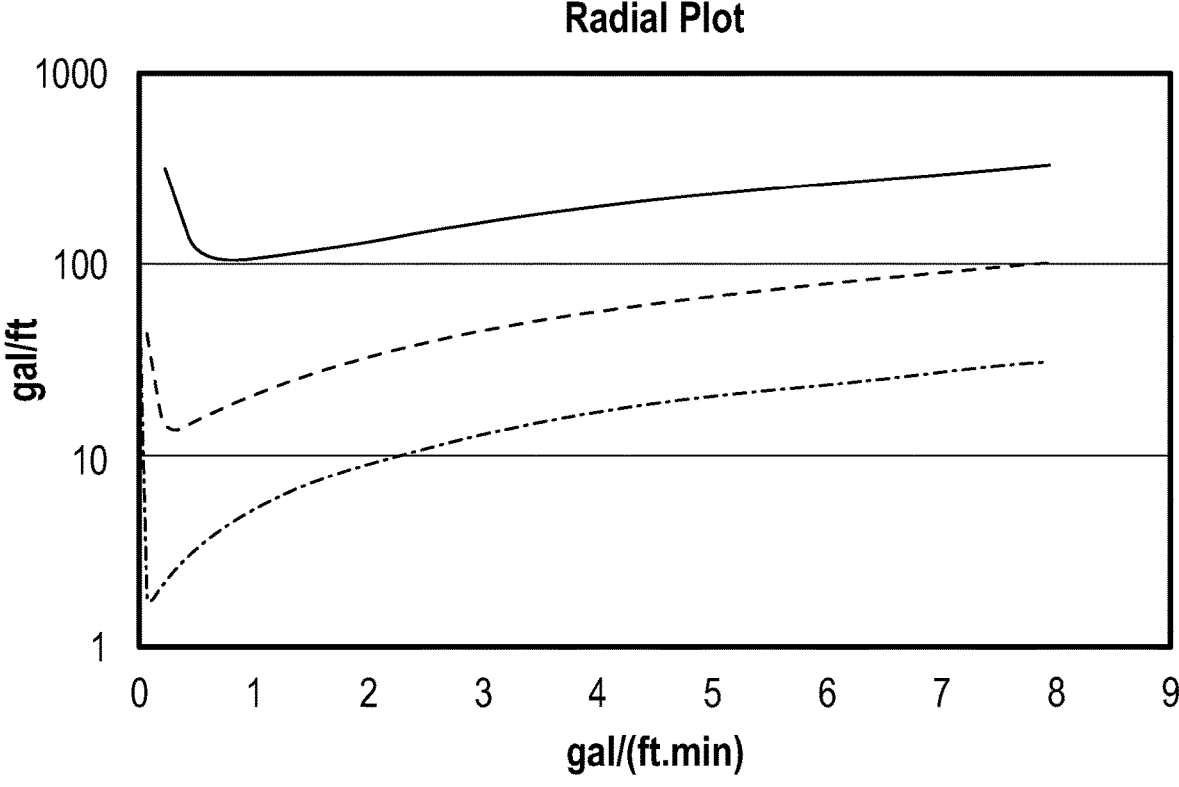
Figure 3:
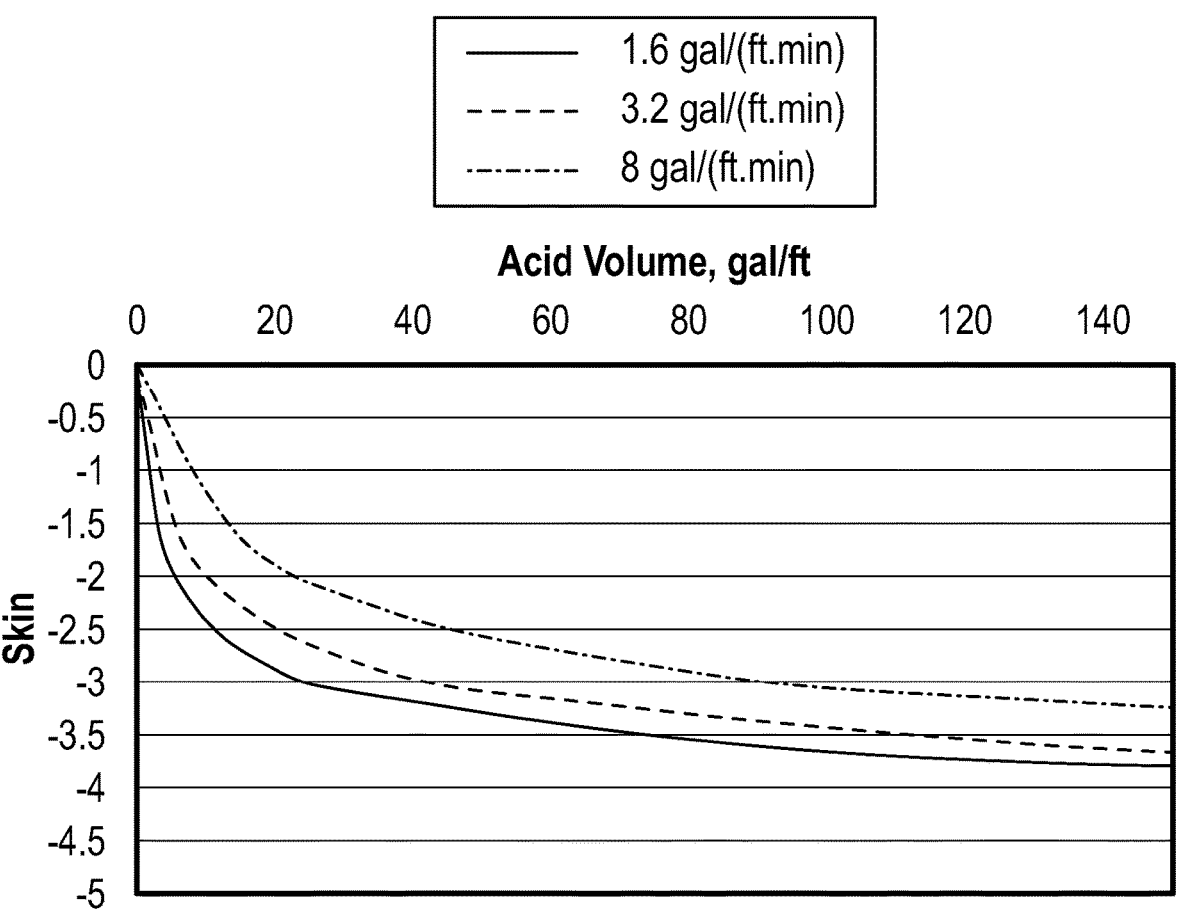
FIG. 3 presents skin factors obtained from pumping stimulation fluid at various rates.
Figure 4:
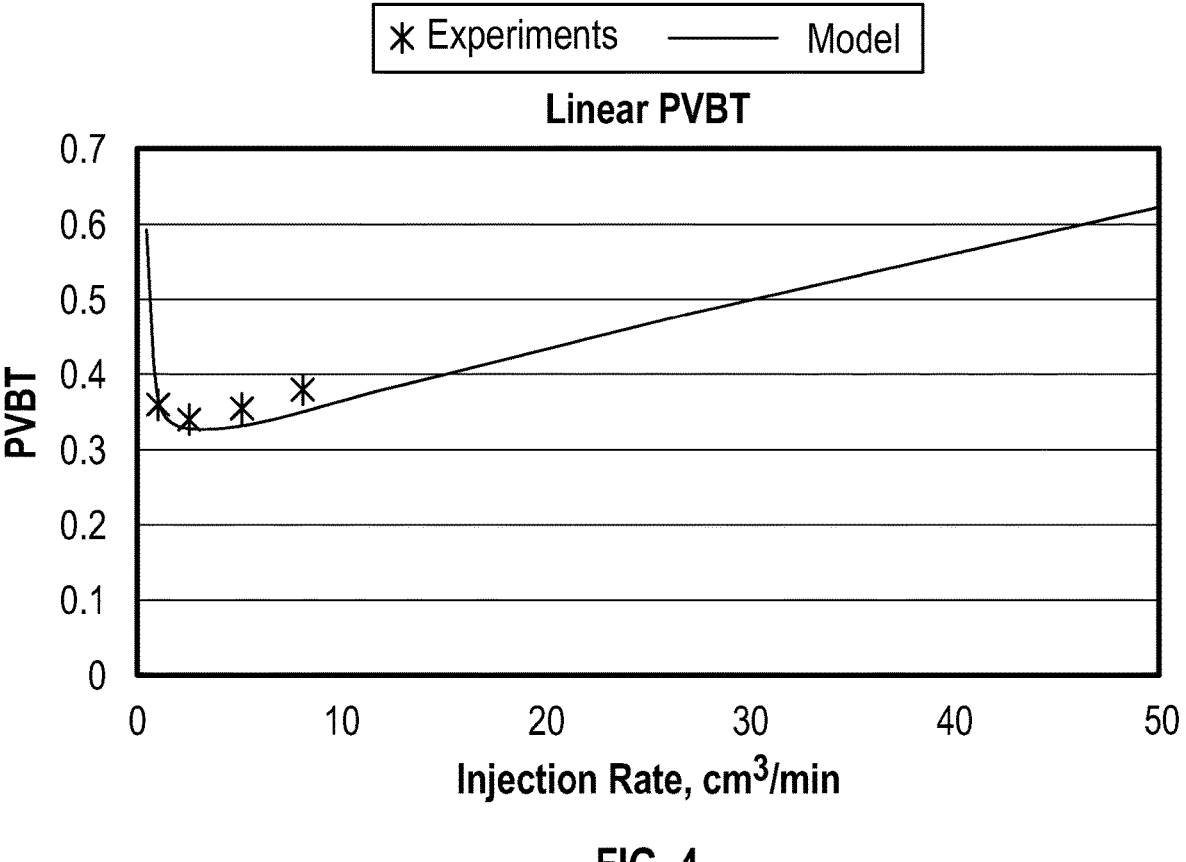
FIG. 4 presents a PVBT comparison between experimental core flow data and a computational model.

The model was upscaled to radial flow (Eq. 35) without additional tuning. FIGS. 2 and 3 show the radial plots for a field treatment.

Example 2

A series of linear core flow tests were performed on Winterset limestone cores with an average permeability of 5 mD. The stimulation fluid was SXE emulsion, available from Schlumberger. The fluid contained 70 parts 15% HCl and 30 parts hydrocarbon phase. The fluid injection rate was varied from about 0.99 cm³/min to about 8.00 cm³/min. The PVBT results are shown in Table 3.

TABLE 3

| PVBT results from linear core flow tests with Winterset limestone cores. | |
| --- | --- |
| q, cm³/min | PVBT |
| 8.004291845 | 0.379652 |
| 5.021459227 | 0.355372 |
| 2.489270386 | .0341968 |
| 0.987124464 | 0.361074 |

Using a polymeric fluid tracer, the flowing fraction of the Winterset limestone was determined to be 0.5.

Based on the experimental conditions and acid type, the model parameters were calculated using Eq. 9. FIG. 1 shows a comparison between the model and the experimental data.

Figure 5:
FIG. 5 presents the data from FIG. 1, upscaled to radial flow, for various skin factors and wormhole lengths.
Figure 5:
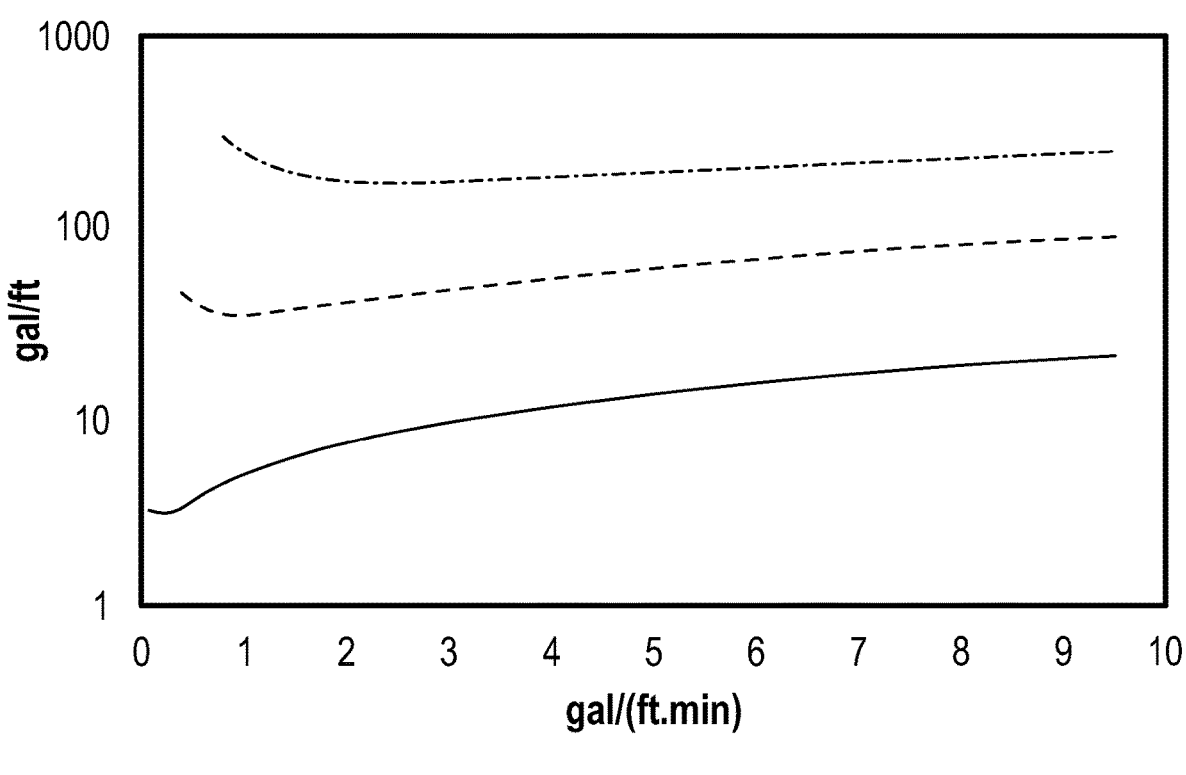
Figure 6:
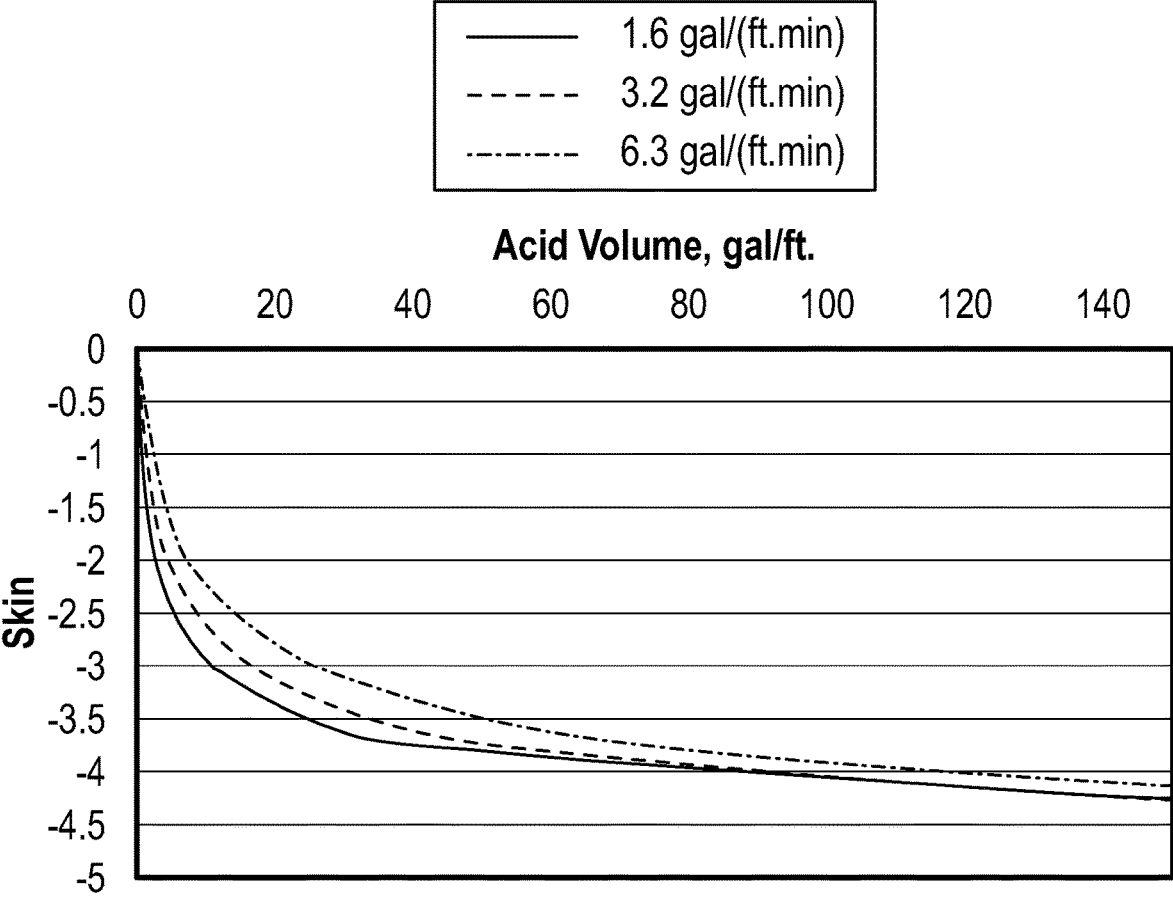
FIG. 6 presents skin factors obtained from pumping stimulation fluid at various rates.

The model was upscaled to radial flow (Eq. 35) without additional tuning. FIGS. 5 and 6 show the radial plots for a field treatment.

16

The invention claimed is:

1. A method for stimulating a carbonate formation, the method comprising:
    generating an acid stimulation model by performing a virtual linear core flow test, wherein performing the virtual linear core flow test comprises:
        calculating a flowing fraction, simulating an injection of a treatment fluid volume of at least one candidate stimulation fluid into an analog core plug at an injection rate, and estimating an effective reaction rate constant;
        scaling the calculated flowing fraction and the estimated effective reaction rate constant from linear flow to radial flow to produce scaled radial flow data; and
        generating the acid stimulation model using the scaled radial flow data;
    determining one or more parameters associated with a stimulation treatment of the carbonate formation based on the generated acid stimulation model, wherein the acid stimulation model comprises a radial pore volume to breakthrough (PVBT) curve that accounts for a radial flow due to targeted wormhole lengths; and
    performing the stimulation treatment based on the one or more parameters.

2. The method of claim 1, wherein the stimulation treatment comprises matrix acidizing, acid fracturing, or acidizing natural fractures, or a combination thereof.

3. The method of claim 1, wherein the stimulation treatment comprises mechanical diversion techniques, or chemical diversion techniques, or both.

4. The method of claim 1, wherein the estimated effective reaction rate constant is an overall reaction rate constant and accounts for both surface reaction and mass transfer rates.

5. A method for stimulating a carbonate formation, comprising:
    generating an acid stimulation model by performing a virtual linear core flow test, wherein performing the virtual linear core flow test comprises:
        calculating a flowing fraction, simulating an injection of a treatment fluid volume of at least one candidate stimulation fluid into an analog core plug at an injection rate, and estimating an effective reaction rate constant;
        scaling the calculated flowing fraction and the estimated effective reaction rate constant from linear flow to radial flow to produce scaled radial flow data; and
        generating the acid stimulation model using the scaled radial flow data;
    determining one or more parameters associated with a stimulation treatment of the carbonate formation based on the generated acid stimulation model, wherein the acid stimulation model comprises a radial pore volume to breakthrough (PVBT) curve that accounts for a radial flow due to targeted wormhole lengths, and wherein the one or more parameters comprise a type of a stimulation fluid used in the stimulation treatment, a concentration of the stimulation fluid used in the stimulation treatment, an injection pressure of the stimulation fluid used in the stimulation treatment, or a volume of the stimulation fluid used in the stimulation treatment, or combinations thereof; and
    performing the stimulation treatment with the stimulation fluid based on the one or more parameters.

6. The method of claim 5, wherein the stimulation treatment comprises matrix acidizing, acid fracturing, or acidizing natural fractures, or a combination thereof.

7. The method of claim 5, wherein the stimulation treatment comprises mechanical diversion techniques, or chemical diversion techniques, or both.

8. The method of claim 5, wherein the estimated effective reaction rate constant is an overall reaction rate constant and accounts for both surface reaction and mass transfer rates.

9. The method of claim 5, wherein the stimulation fluid comprises a hydrochloric acid solution, a solution of hydrochloric acid and hydrofluoric acid, an emulsified hydrochloric acid, an organic acid, a chelant, a retarded acid, or an accelerated acid, or a combination thereof.

10. The method of claim 9, wherein the stimulation fluid comprises the chelant, and wherein the chelant is selected from the group consisting of EDTA (ethylenediamine tetraacetic acid), diethylenetriaminepentaacetic acid (DTPA), citric acid, nitrilotriacetic acid (NTA), ethylene glycol-bis (2-aminoethyl)-N,N,N',N'-tetraacetic acid (EGTA), 1,2-bis (o-aminophenoxy) ethane-N,N,N',N'-tetraacetic acid (BAPTA), cyclohexanediaminetetraacetic acid (CDTA), triethylenetetraaminehexaacetic acid (TTHA), N-(2-Hydroxyethyl) ethylenediamine-N,N',N'-triacetic acid (HEDTA), glutamic-N,N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetramethylene phosphonic acid (EDTMP), diethylene-triamine penta-methylene phosphonic acid (DETPMP), amino tri-methylene phosphonic acid (ATMP), and diethanolamine (DEA), and combinations thereof.

11. A method for stimulating a carbonate formation, comprising:

generating an acid stimulation model comprising a radial pore volume to breakthrough (PVBT) curve that accounts for a radial flow due to targeted wormhole lengths, wherein generating the acid stimulation model comprises:

calculating a flowing fraction;

estimating an effective reaction rate constant; and generating the acid stimulation model based on the calculated flowing fraction and the estimated effective reaction rate constant;

determining one or more parameters associated with a stimulation fluid of the carbonate formation based on the generated acid stimulation model; and performing a stimulation treatment based on the one or more parameters.

12. The method of claim 11, wherein the one or more parameters comprise a type of a stimulation fluid used in the stimulation treatment, a concentration of the stimulation fluid used in the stimulation treatment, an injection pressure of the stimulation fluid used in the stimulation treatment, or a volume of the stimulation fluid used in the stimulation treatment, or a combination thereof.

13. The method of claim 11, wherein the stimulation treatment comprises a stimulation fluid, and wherein the stimulation fluid comprises a viscoelastic surfactant.

14. The method of claim 13, wherein the viscoelastic surfactant is anionic, cationic, nonionic, or zwitterionic.

\* \* \* \* \*